(12) United States Patent
Arnaud et al.

(10) Patent No.: US 6,249,289 B1
(45) Date of Patent: *Jun. 19, 2001

(54) MULTI-PURPOSE HIGH RESOLUTION DISTORTION CORRECTION

(75) Inventors: Remi Arnaud, Mountain View; Javier Castellar, Santa Clara; Michael Timothy Jones, Los Altos, all of CA (US)

(73) Assignee: Silicon Graphics, Inc., Moutain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,021

(22) Filed: Nov. 27, 1996

(51) Int. Cl.$^7$ .................................................. G06T 3/00
(52) U.S. Cl. ..................... 345/436; 345/425; 345/427; 345/430
(58) Field of Search ................................ 345/427, 426, 345/436, 430, 425

(56) References Cited

U.S. PATENT DOCUMENTS

| | | | |
|---|---|---|---|
| 4,695,964 | * | 9/1987 | Seto et al. ............................. 345/427 |
| 4,862,388 | * | 8/1989 | Bunker ................................. 345/427 |
| 5,204,944 | * | 4/1993 | Wolberg et al. ...................... 345/427 |
| 5,278,949 | * | 1/1994 | Thayer ................................. 345/426 |
| 5,319,744 | * | 6/1994 | Kelly et al. .......................... 345/436 |

* cited by examiner

*Primary Examiner*—Mark Zimmerman
*Assistant Examiner*—Kimbinh T. Nguyen
(74) *Attorney, Agent, or Firm*—Sterne, Kessler, Goldstein & Fox P.L.L.C.

(57) ABSTRACT

A high resolution distortion correction system is provided for an arbitrary projection system. First, a field of view is subdivided into multiple viewports. The multiple subdivided viewports provide a first approximation of the distortion. Polygons that are projected onto a particular subdivided viewport are rendered in a frame buffer and stored in texture memory as an intermediate texture image. The intermediate texture images are subsequently applied to a rendered distortion mesh to generate an output image.

25 Claims, 7 Drawing Sheets

MULTI-PURPOSE HIGH RESOLUTION DISTORTION CORRECTION

BACKGROUND OF THE INVENTION

1. Field of the Invention

The present invention relates generally to computer graphics imagery, and more specifically, toward distortion correction in the display of computer generated imagery.

2. Related Art

Computer graphics applications often require the generation of complex three-dimensional surfaces (e.g., representing a car, a face, etc.) in world space. These complex three-dimensional surfaces are conventionally approximated with a mesh (or tessellation) of polygons (e.g., triangles). Generally, a polygon mesh is a collection of edges and vertices. An edge connects two vertices, and a polygon is a closed sequence of edges.

FIG. 1 illustrates a projection of an object 104 in world space 106 to screen space 108. In this projection, an image generator uses Thales theorem in real time to produce the image exposed to an observer 102. The projection transformation is applied to vertices because in Thales transformation, a straight line defined by a polygon edge in world space 106, is transformed to a straight line defined by the polygon edge in screen space 108.

Note that Thales theorem can be used to identify the distance H2 in screen space 108. First note that L1=M*cos θ and H1=M*sin θ, where M is equal to the distance between observer 102 and vertex 110. By substituting the values for L1 and H1 into Thales theorem, the value H2 is found to be equivalent to L2*tan θ. The equation H2=L2*tan θ represents the basic equation for generating images in screen space 108. For the remainder of this description, the image generator that projects objects in world space to a planar viewing window is referred to as a k*tan θ image generator.

As exemplified in FIG. 1, the computed image generated by the k*tan θ image generator can be directly displayed on a monitor or a behind-the-screen projection system as long as the projector is pointing in a direction that is perpendicular to the screen. If the projector is not pointing in a direction that is perpendicular to the screen, the displayed image becomes distorted and the picture produced by the projector may no longer appear rectangular.

In one conventional solution, the trapezoidal distortion is handled directly by the projector. However, standard projectors cannot handle a lot of distortion. Further, standard projectors also have problems with focal distance and brightness regularity. In another conventional solution, the trapezoidal distortion is handled by an image generator that modifies the projection law.

Modification of a projection law becomes increasingly difficult when the screen is no longer flat (e.g., spherical). In this scenario, straight lines in world space are transformed into curved lines in screen space. As noted above, the distortion can be corrected after the image has been generated by modifying the projector. This can be accomplished by adding specific hardware directly to the projector, or as a front end to the projector. In this process, a 2D distortion map is applied to the image produced by the image generator. This solution is acceptable for low levels of distortion.

However, consider a spherical screen (i.e., θ projection system). In this scenario, a significant loss of perceived resolution is encountered outside of a 60 degree viewing pyramid. FIG. 2 illustrates a viewing pyramid that is made by joining the observer to the screen 210, which for simplicity is . After 65 degrees (i.e., both $\theta_x$ and $\theta_y$ are greater than 65 degrees), the image correction will have to produce two pixels out of only one that is computed by the image generator, thereby diminishing the resolution.

In another conventional method, distortion correction is performed by subdividing polygon edges. This functionality is usually incorporated into the heart of the pixel-processing system, thereby limiting its portability. In this technique, a grid of distortion information is used to clip polygon edges. A polygon edge is cut into a plurality of segments defined by a plurality of vertices. The position of these vertices are adjusted to match the distortion. A drawback of this conventional method is the processing power required for implementation. The processing power required is substantially increased based upon the increased number of vertices created by the polygon edge subdivisions. This limits the ability to correct distortion on a per-pixel basis.

What is generally needed is a distortion correction system and method that provides an open solution. This would enable the system to compensate for various sources of distortion that include the screen form, projector position, projector's optical lens, the field of view, observer position, etc.

SUMMARY OF THE INVENTION

The present invention satisfies the above mentioned needs by providing a distortion correction system and method that is programmable and does not rely on any projection system assumptions. Generally, the present invention uses a two-pass system. In the first pass, a field of view (e.g., 180°×180° half spherical screen) is subdivided into one or more viewports through which objects in world space can be viewed. The projection of polygons onto the subdivided viewports provides a first approximation to the distortion (i.e., a "facet-eye" view of the objects in world space).

The second pass uses the intermediate images generated by each of the subdivided viewports in the first pass. These intermediate images are applied to a distortion mesh using a texture projection technique. Generally, the distortion mesh includes vertices that have texture coordinates representing pixels in a final distorted image. The resulting image produced by the mesh, covered with the texture of the intermediate images, represents the output image that is provided to a display generator.

One advantage of the present invention is the ability for an observer to interactively adjust the initially defined distortion mesh based upon the viewing of the final output image. This process ensures that the distortion mesh accounts for all sources of distortion, even those that could not be identified in the initial system model. Specifically, a mouse or any other pointing device can be used to interactively adjust the perceived distortion correction thereby adjusting the vertices of the distortion mesh.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention provides a programmable solution to the distortion correction problem. This open solution does not rely on any projection system assumptions, thereby allowing distortion correction based upon inputs that include the type of projection system, the projector position, the projector's optical lens, the field of view, the observer perceived resolution, etc. Additionally, the programmability of the system can also modify the distortion correction process to compensate in real-time for movement in the observer's position or switching from a first to a second observer position (e.g., different seats in a flight simulator).

Generally, the present invention uses a two-pass system. In the first pass, an approximation to the distortion is generated using subdivided viewports. The resulting intermediate image is a "facet-eye" view of the objects in world space. The greater the number of subdivided viewports, the less approximated the result.

The second pass uses the intermediate images generated by each of the subdivided viewports in the first pass. These intermediate images are applied to a distortion mesh using a texture projection technique. The resulting image produced by the distortion mesh, covered with the texture of the intermediate images, represents the output image that is provided to a display generator.

Figure 1:
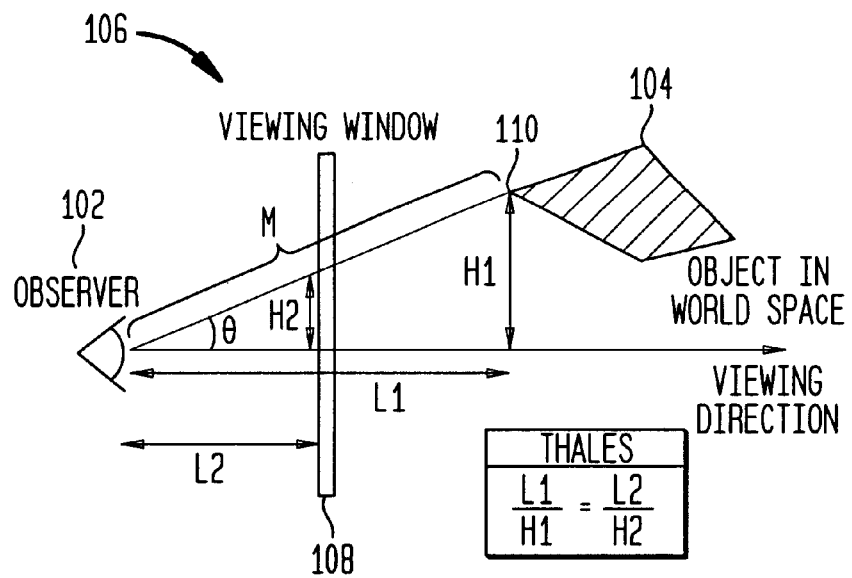
FIG. 1 illustrates an exemplary projection of objects in world space to a flat screen.
Figure 2:
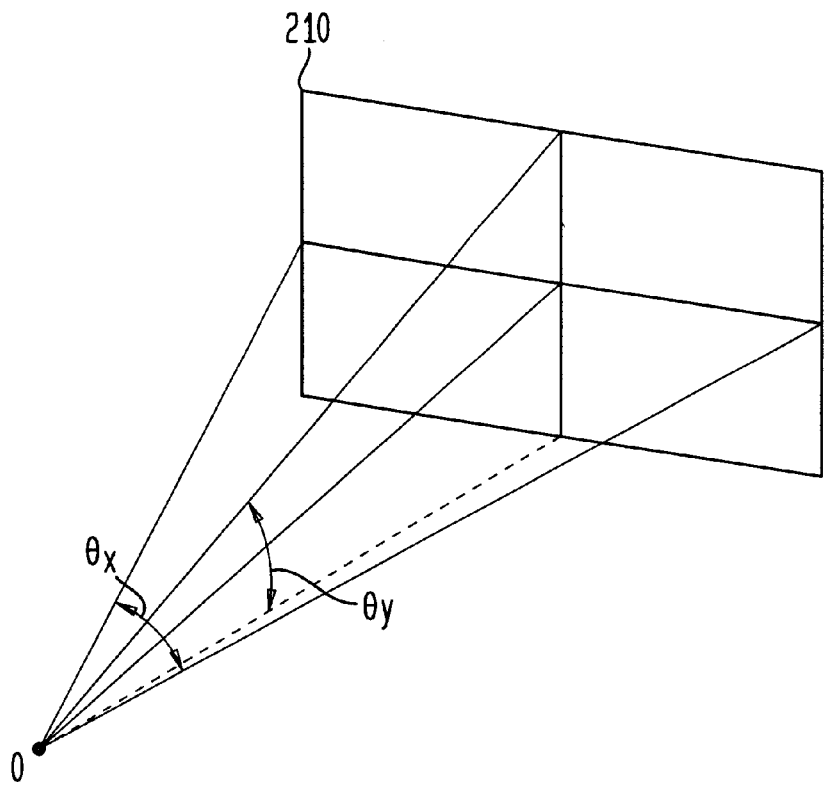
FIG. 2 illustrates a viewing pyramid.
Figure 3:
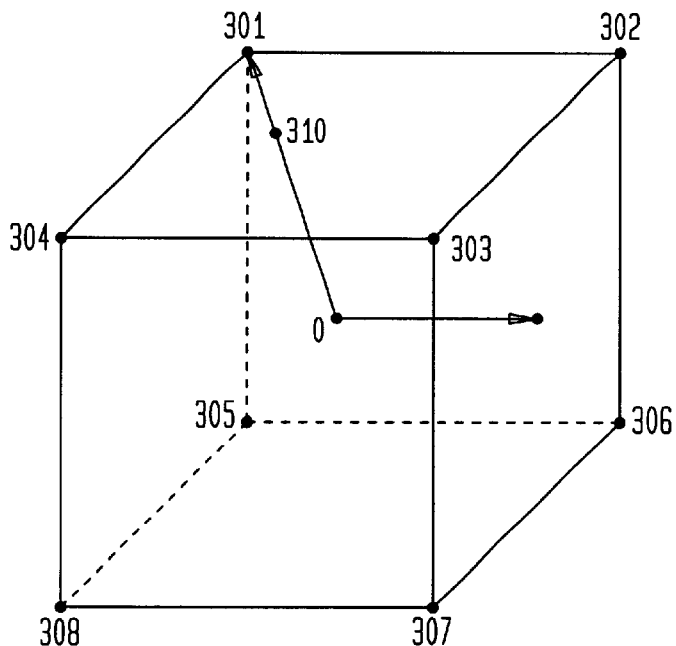
FIG. 3 illustrates subdivided viewports represented by faces in a cube.

Having described the distortion correction process at a high level, the details of each of the two passes are now provided. As noted above, the first pass approximates the distortion using one or more subdivided viewports. These viewports subdivide an observer's field of view. In the simple example of a 360°×360° field of view (representing a completely spherical screen), six subdivided viewports can be used. These six subdivided viewports are represented by the six faces of a cube centered at the observer position O (see FIG. 3).

Figure 4A:
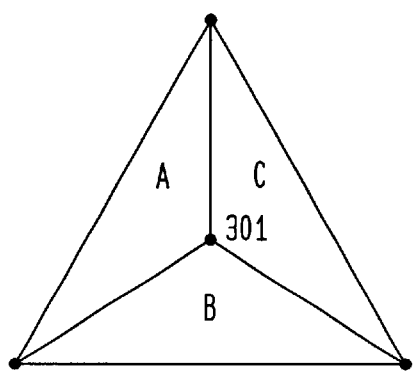
FIGS. 4A and 4B illustrate a 180°×180° field of view that is subdivided into three and five viewports.

Continuing in the cubic example, it is further evident that a 180°×180° field of view (representing half of a spherical screen) can be represented by three or five faces of the cube. To illustrate the three-face example, consider the 180°×180° field of view that is centered upon the direction from observer position O to vertice 301. Specifically, consider the field of view, as the observer position moves to point 310. This operation effectively "grows" the walls defined by vertices 301-302-303-304 (face A), 301-304-308-305 (face B), and 301-302-305-306 (face C) until only faces A, B and C are evident in the 180°×180° field of view. This view is illustrated by FIG. 4A.

Figure 4B:
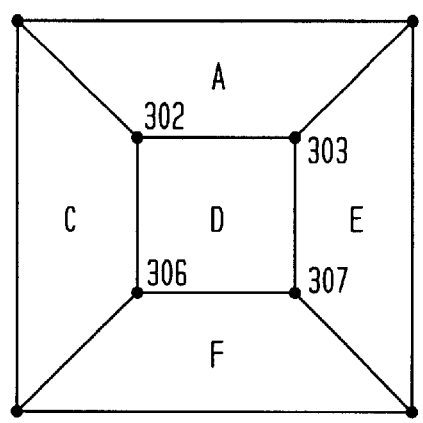

To illustrate the five-face example, consider the 180°×180° field of view that is centered upon the direction from observer position O to the center of the face defined by vertices 302-303-306-307 (face D). For this scenario, the five faces that are evident include faces D (directly ahead), A (top), C (left), E (right) and F (bottom). This view is illustrated by FIG. 4B.

Before continuing on to the projection element of the first pass, it should be noted that the cubic example described above was chosen for simplicity of illustration. As will be apparent from the following description, the inventive concepts of the present application are independent of the specific number and orientation of the subdivided viewports. The orientation and/or number of subdivided viewports can be chosen to provide a reasonably close approximation to a particular screen configuration. A general objective of the first pass is to ensure that enough resolution is available for the second pass. For example, in a preferred embodiment, the first pass provides enough resolution to the second pass such that the second pass outputs no more than two pixels for only one pixel that is computed. A close approximation to the distortion is not required.

After the set of subdivided viewports have been defined, the objects in the world space are then projected onto the plurality of subdivided viewports to identify the polygons that are viewed through individual viewports. In a preferred embodiment, the $k*\tan \theta$ projection of polygons in the world space is implemented using a 4×4 perspective projection matrix. This 4×4 perspective projection matrix can handle non-symmetric projections where a non-centered observer is not looking perpendicular to the viewport. This property of a 4×4 perspective projection matrix helps approximate the distortion problem with fewer viewports.

J. D. Foley et al., "Computer Graphics: Principles and Practice," 2nd ed., Addison-Wesley Publishing, 1990, pp. 254–258 describes a simple example of a 4×4 perspective projection matrix ($M_{per}$) that is operative on points (P) in the homogeneous coordinates system (x, y, z, 1). Specifically, the transformation is represented by the equation below where d represents the position of the projection plane along the z-axis.

$$\begin{bmatrix} X \\ Y \\ Z \\ W \end{bmatrix} = M_{per} * P = \begin{bmatrix} 1 & 0 & 0 & 0 \\ 0 & 1 & 0 & 0 \\ 0 & 0 & 1 & 0 \\ 0 & 0 & 1/d & 0 \end{bmatrix} * \begin{bmatrix} x \\ y \\ z \\ 1 \end{bmatrix}$$

Note that the specific 4×4 projection matrix used is implementation specific. Additional 4×4 projection matrices can be defined based upon linear affine transformations. One example is represented by the 4×4 perspective projection matrix identified by "OpenGL, Programming Guide", Release 1, Addison-Wesley Publishing Company, 1995, p. 480. In this example, after the 4×4 matrix is applied to vertices in the homogeneous system (x, y, z, 1) giving (X, Y, Z, W), a clipping is done for vertices that are not in the [−1, 1] range on each dimension. This clipping process eliminates the polygons that are not projected onto the viewport of interest.

Completion of the first pass is achieved after the projections onto the multiple subdivided viewports are effected. Prior to describing the second pass, it should be noted that viewport mechanisms may be operative only on rectangular windows. With this limitation, some over covering and overlapping can occur. For example, consider the 180°×180° view defined by the three faces A, B and C in FIG. 4A. In this case, the three faces A, B and C are not rectangular. Accordingly, the viewport defined for each of faces A, B, and C are redefined to be rectangular.

Figure 5:
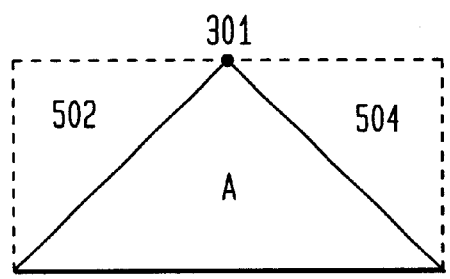
FIG. 5 illustrates the redefinition of a non-rectangular subdivided viewport.

FIG. 5 illustrates the redefinition of subdivided viewport A. Through this redefinition, additional areas 502 and 504 are included as part of viewport A. Similar redefinitions of viewports B and C would also exist. Additional areas 502 and 504 are similarly involved in the first pass of the distortion correction process. In other words, objects in the world space are also projected onto areas 502 and 504. Overlapping occurs since a single polygon may be projected onto more than one subdivided viewport. Over covering occurs since a polygon that otherwise would not have been projected onto any of the subdivided viewports is now projected onto an area similar to areas 502 and 504. As will be described in greater detail below, the overlapping and over covering issues are handled by the dynamics of the second pass.

Figure 6:
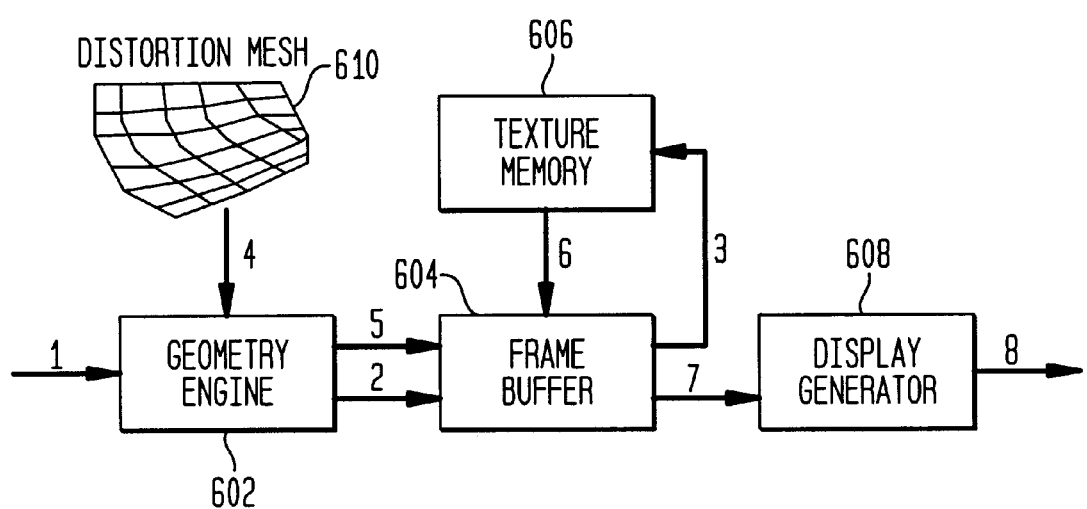
FIG. 6 illustrates an embodiment of the processing elements that are used to implement the second pass of the distortion correction process.

FIG. 6 illustrates an embodiment of the elements that are used to implement the second pass of the distortion correction process. These elements are operative on the polygons of objects in the world space that can be projected onto one of the subdivided viewports defined in the first pass. Generally, the processing for each of the subdivided viewports comprises three initial processing steps. First, the polygons that can be projected onto the viewport are sent to geometry engine 602 (path 1). Note that a particular polygon will be sent to geometry engine 602 for each viewport upon which it is projected. Thus, a polygon may be sent to geometry engine 602 more than once. As described above, this situation can occur when subdivided viewports overlap due to the extension of originally non-rectangular viewports.

Second, the polygons for the viewport are rendered in 2D frame buffer 604 (path 2) to produce an intermediate image. Finally, instead of copying the intermediate image (i.e., rendered polygons) directly to display generator 608, the intermediate image in 2D frame buffer 604 is copied to texture memory 606 (path 3).

As illustrated in FIG. 6, a distortion mesh 610 is also sent to geometry engine 602 for rendering. Generally, distortion mesh 610 is a polygon mesh that models the distortion. Distortion mesh 610 can be static or generated in real-time. Defined in three dimensions, distortion mesh 610 can be a polygon mesh that is modeled in the shape of the screen (e.g., spherical, cylindrical, etc.).

Generally, the number of vertices present in distortion mesh 610 is dependent upon the magnitude of the distortion. Distortion mesh 610 can also be defined in two dimensions. In this case, the two-dimensional distortion mesh represents a projected version of the three-dimensional mesh. In either case, each vertex of distortion mesh 610 has a texture coordinate that corresponds to a particular pixel in texture memory 606. The mapping of pixels in texture memory 606 to vertices in distortion mesh 610 depends upon the observer position. This process is described in greater detail below.

Referring again to FIG. 6, distortion mesh 610 is sent to geometry engine 602 (path 4) in a similar manner to the polygons in the subdivided viewports (path 1). Thereafter, distortion mesh 610 is rendered in 2D frame buffer 604 (path 5). Note that if distortion mesh 610 was originally defined as a two dimensional distortion mesh, the rendering of distortion mesh 610 is based upon an identity projection matrix. After distortion mesh 610 has been rendered in 2D frame buffer 604 (path 5), the intermediate texture images previously stored in texture memory 606 (path 3) are mapped onto the rendered distortion mesh (path 6).

Figure 7:
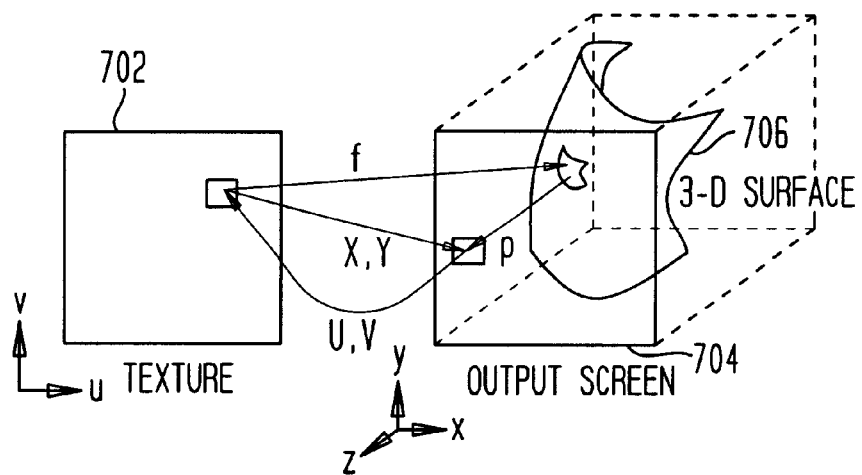
FIG. 7 illustrates an example of a texture mapping process.

FIG. 7 illustrates an example of a texture mapping process. This process includes a series of spatial transformations. First, texture space 702 is transformed by a function f(u,v) onto a 3D surface 706 (x,y,z). This mapping process can be thought of as applying image detail to a surface, in much the same way as wallpaper. The image data that is mapped onto 3D surface 706 is subsequently projected by a function p(x,y,z) onto image plane 704 (i.e., screen space x,y) for display. The forward mapping function X and Y represents the composite function p(f(u,v)). Texture mapping is described in greater detail in G. Wolberg, "Digital Image Warping", IEEE Computer Society Press, 3rd ed., 1994.

In a preferred embodiment, a bilinear interpolation method is used to get a texture value out of texture memory 606 for each drawn pixel. Generally, bilinear interpolation utilizes a linear combination of the four closest pixel values to produce a new, interpolated value. Bilinear interpolations and related methods of spatial transformations are well known to those of ordinary skill in the relevant art.

Figure 8:
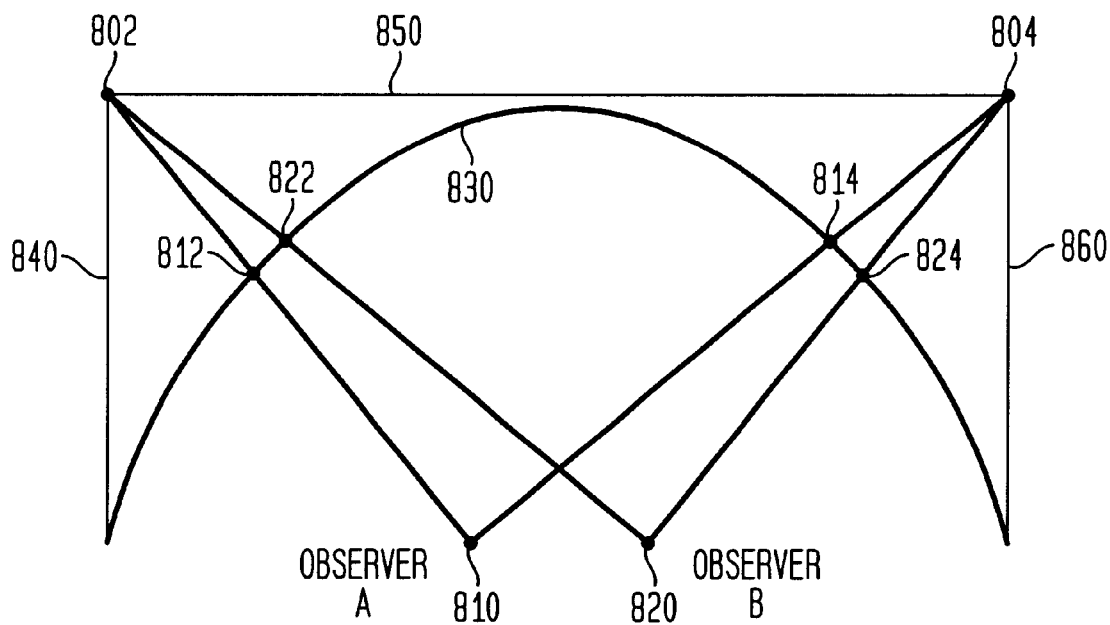
FIG. 8 illustrates a mapping of vertices on a distortion mesh to pixels in a texture memory.

As noted above, each vertex in distortion mesh 610 has a texture coordinate that corresponds to a pixel in texture memory 606. An example of this mapping is described with reference to FIG. 8. Generally, FIG. 8 illustrates a top view of a cylindrical screen 830. Cylindrical screen 830 is used for the projection of simulations that can be viewed by two observers A and B that are situated at observer locations 810 and 820, respectively. In implementing the distortion correction process, the field of view is first subdivided into a plurality of viewports that include viewports 840, 850 and 860. Polygons projected onto each of viewports 840, 850 and 860 are rendered and subsequently stored as intermediate images in texture memory 606.

Assume that the distortion mesh in the context of FIG. 8 is defined as a polygon mesh in the shape of screen 830. In defining a mapping of pixels in the intermediate texture images to distortion mesh 830, an observer position must first be defined. Consider first observer A at position 810. In this case, vertex 812 on distortion mesh 830 corresponds to a pixel 802 that resides at or near the edges of viewports 840 and 850. Similarly, vertex 814 on distortion mesh 830 corresponds to a pixel 804 that resides at or near the edges of viewports 850 and 860. Generally, the vertices on distortion mesh 830 that lie between vertices 812 and 814 will map to pixels that reside along the span between pixels 802 and 804.

Next, consider observer B at position 820. In this case, vertex 822 on distortion mesh 830 corresponds to a pixel 802 that resides at or near the edges of viewports 840 and 850. Similarly, vertex 824 on distortion mesh 830 corresponds to a pixel 804 that resides at or near the edges of viewports 850 and 860. Again, the vertices on distortion mesh 830 that lie between vertices 822 and 824 will map to pixels that reside along the span between pixels 802 and 804.

As this example illustrates, a unique mapping can be defined for each unique observer position. As a consequence, the display of a distortion corrected image is valid for only a single observer at or near a single observer position. If an the observer moves within the projection system, the mapping can be redefined in real-time to alter the distortion correction process. Similarly, for the example of the two observers 810 and 820, the display can be switched between two distortion correction states.

As a further consequence of the mapping process, overlapped and over covered areas that exist in texture memory 606 are simply not utilized. In other words, the overlapped and over covered areas exist in texture memory 606 but are not mapped to any part of the rendered distortion mesh within frame buffer 604.

After each portion of the rendered distortion mesh is mapped with the relevant part of an intermediate texture image in texture memory 606, the output image is completed. The output image is sent directly to display generator 608 (path 7) and then subsequently from display generator 608 to a projector (path 8). Note that the projector may utilize only a portion of the output image. For example, the projector having a "fisheye" lens for a θ projection system will use only a circular portion of a rectangular output image.

Figure 9:
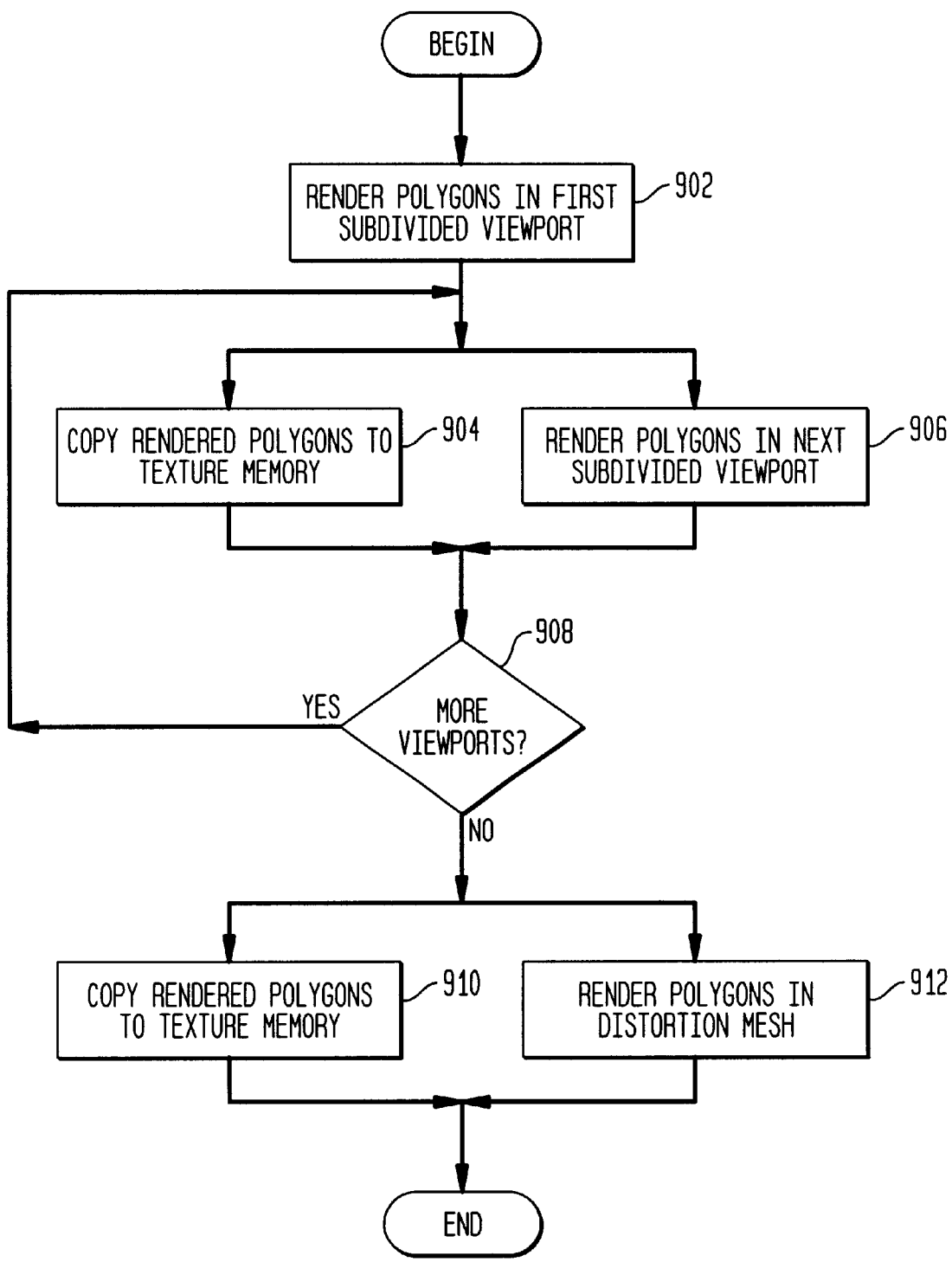
FIG. 9 illustrates a flow chart of a parallel method of rendering viewports and copying the rendered viewports to texture memory.

In one embodiment, the process of rendering polygons projected in subdivided viewports and copying the rendered polygons to texture memory 606 can be done in parallel. This parallel process is illustrated in FIG. 9. Starting at step 902, the polygons for a first subdivided viewport are rendered in 2D frame buffer 604. After the polygons have been rendered, steps 904 and 906 are performed in parallel. In step 904, the polygons that have been rendered in step 902 are copied into texture memory 606. In step 906, the polygons projected into a second subdivided viewport are rendered in 2D frame buffer 604. If the system determines at step 908 that there are more viewports to be processed, the system loops back to perform the parallel steps 904 and 906 again.

If, on the other hand, the system determines at step 908 that all viewports (e.g., three for a 180°×180° field of view) have been processed, then the process continues to parallel steps 910 and 912. Parallel steps 910 and 912 are analogous to parallel steps 904 and 906. In both cases, a rendered result is copied to texture memory 606 while another group of polygons are submitted to geometry engine 602 to be rendered. Specifically, at step 910, the rendered polygons of the last subdivided viewport are copied to texture memory 606, while, at step 912, the polygons of distortion mesh 610 are rendered. Note that distortion mesh 610 can be broken up into pieces and submitted sequentially for rendering. The rendered polygons of distortion mesh 610 are not copied to texture memory 606.

In an alternative embodiment, texture memory 606 is not distinct from frame buffer 604. Accordingly, no copying of intermediate texture images is required from frame buffer 604 to texture memory 606 (path 3). The parallelism of steps 904/906 and 910/912 is therefore obviated.

Other methods for increasing processing efficiency are based upon the definition of the distortion mesh itself. Consider the example of FIG. 9 which illustrates a top view of a cylindrical projection system. In this example, the field of view is subdivided into multiple viewports comprising viewports 902, 904 and 906. As described above, the polygons projected into each of viewports 902, 904 and 906 are rendered in frame buffer 604. For a globally defined distortion mesh (i.e., defined over the entire output image), all rendered polygons that are part of the final output image are copied to texture memory 606.

Note, however, that the levels of distortion across the output image approximated by the first pass can vary significantly. In certain areas, the faceted view provided by the multiple subdivided viewports may acceptably approximate the actual distortion. In other areas, the approximation is insufficient, thereby requiring the additional distortion correction provided by the second pass.

Figure 10:
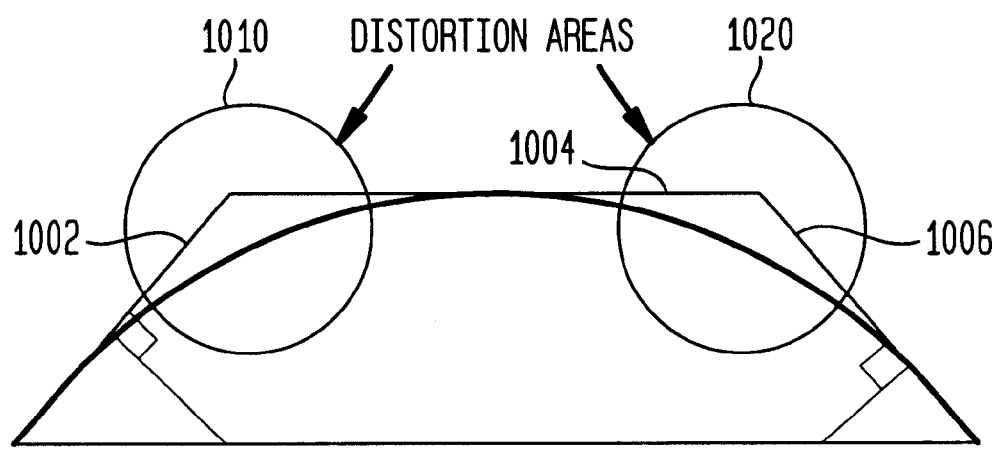
FIG. 10 illustrates an example of an application of a locally defined distortion mesh.

In the context of the example of FIG. 10, areas 1010 and 1020 can individually require distortion correction beyond the first pass. Accordingly, a locally-defined distortion mesh can be created. This locally-defined distortion mesh can be defined in pieces and passed individually to geometry engine 602. The remaining pieces of the distortion mesh, corresponding to portions of the output image that do not require further distortion beyond the first pass, are represented by holes in the distortion mesh.

Generally, texture mapping of intermediate texture images are not applied to holes in the distortion mesh. Accordingly, the system does not need to copy the entire intermediate texture image of a subdivided viewport to texture memory 606. Rather, only those portions of the intermediate texture image that correspond to the defined portions of the distortion mesh need to be copied to texture memory 606. The portions of the intermediate texture image that correspond to the holes in the distortion mesh represent parts of the output image itself and do not need to be copied to texture memory 606. As one can readily appreciate, the reduction in copying, rendering and texture mapping for the holes in the distortion mesh can greatly enhance the processing efficiency in real-time distortion correction applications. In the embodiment where texture memory 606 is incorporated as part of frame buffer 604, processing efficiency is improved by the reduction in rendering and texture mapping for the holes in the distortion mesh.

One advantage of the present invention is the manner in which the distortion correction can be finely tuned to a specific projection application. As noted above, distortion correction is based upon numerous factors including the type of projection system, the projector position, the projector optical lens, the field of view, the observer perceived resolution, etc. Each of these individual effects can be accounted for initially based upon an analytical solution to the system model. In operation, however, each of the individual effects can deviate from the initial system model. For example, in a θ projection system, the ideal position for the projector and the observer is at the center of the sphere. However, since both cannot occupy the same physical space, slight deviations from the ideal case necessarily occur. Similarly, imperfections in the projector lens cannot be accounted for in the system model.

The present invention can account for these numerous deviations through an observer-based system tuning process. In this observer-based tuning process, the observer interactively adjusts the distortion mesh based upon the viewing of the final output image. This process ensures that the distortion mesh accounts for all sources of distortion, even those that could not be identified in the initial system model. A complex process can therefore be reduced to a problem of user-driven optimization.

Final observer-based tuning is accomplished through the use of a test image. This test image can be based upon a pattern of cubes defined in world space. The pattern of cubes should ideally be viewed by the observer, after distortion correction, as a symmetric grid pattern. Any significant imperfections in the initially defined distortion mesh 610 will result in obvious deviations in the grid pattern.

To adjust distortion mesh 610, a mouse or any other pointing device is used to interactively adjust the vertices of distortion mesh 610. Significantly, the mouse or equivalent pointing device is under control of the observer seated in the observer's position. The observer is able to select and move points on the screen that map to corresponding vertices of distortion mesh 610. If distortion mesh 610 is defined as a two dimensional mesh, then the points on the screen can directly correspond to vertices on distortion mesh 610. If distortion mesh 610 is defined as a three-dimensional mesh, on the other hand, the points on the screen correspond to vertices on distortion mesh 610 after an inverse mapping process. In either case, the observer is able to interactively adjust the distortion mesh to model the cumulative effect of all sources of distortion. This distortion correction process is clearly portable across various systems and applications.

Figure 11:
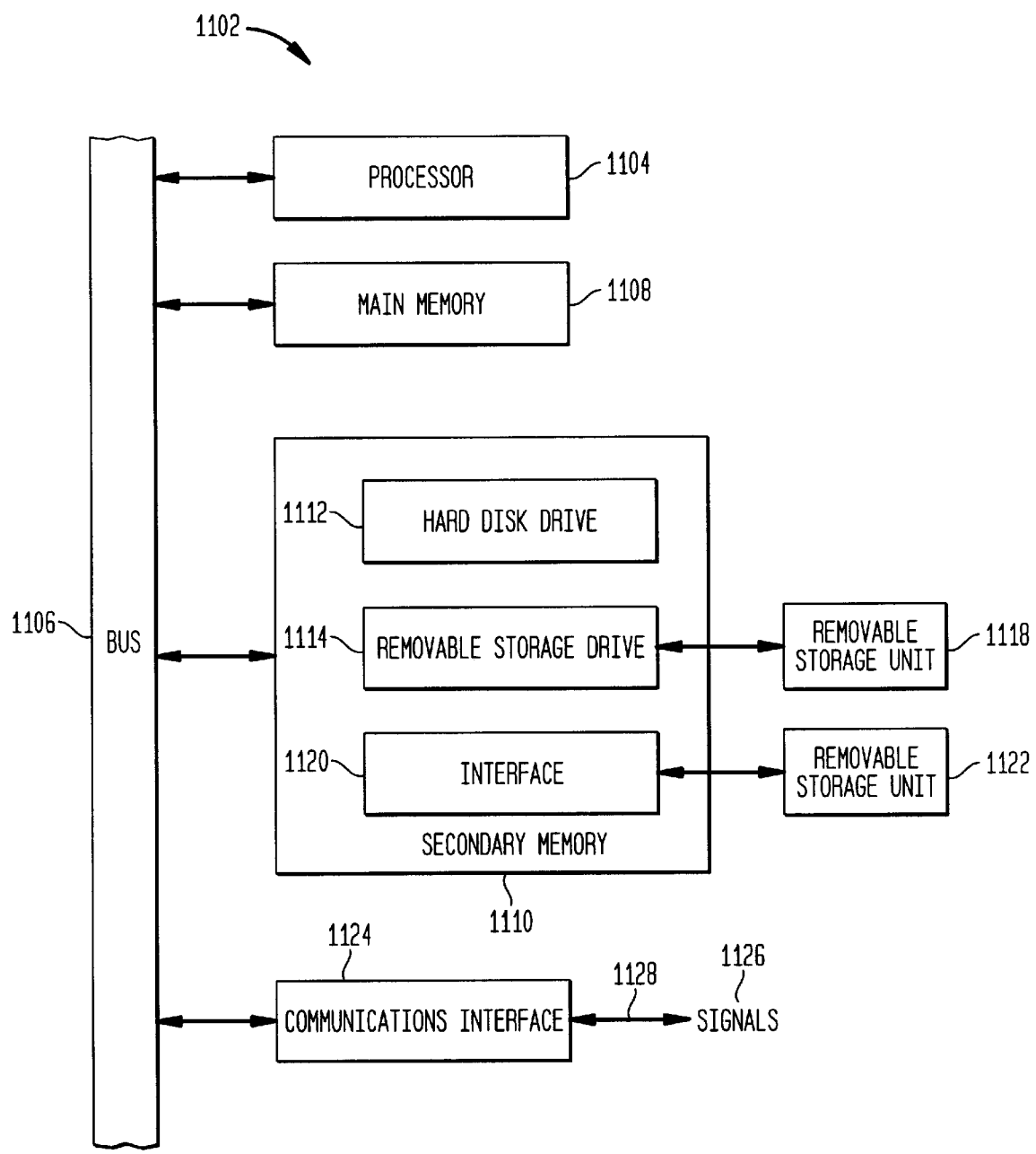
FIG. 11 illustrates a block diagram of a computer useful for implementing elements of the present invention.

As stated above, the invention may be implemented using hardware, software or a combination thereof and may be implemented in a computer system or other processing system. In fact, in one embodiment, the invention is directed toward a computer system capable of carrying out the functionality described herein. An example computer system 1102 is shown in FIG. 11. The computer system 1102 includes one or more processors, such as processor 1104. The processor 1104 is connected to a communication bus 1106. Various software embodiments are described in terms of this example computer system. After reading this description, it will become apparent to a person skilled in the relevant art how to implement the invention using other computer systems and/or computer architectures.

Computer system 1102 also includes a main memory 1108, preferably random access memory (RAM), and can also include a secondary memory 1110. The secondary memory 1110 can include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other means for allowing computer programs or other instructions to be loaded into computer system 1102. Such means can include, for example, a removable storage unit 1122 and an interface 1120. Examples of such can include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1118 to computer system 1102.

Computer system 1102 can also include a communications interface 1124. Communications interface 1124 allows software and data to be transferred between computer system 1102 and external devices. Examples of communications interface 1124 can include a modem, a network interface (such as an Ethernet card), a communications port, a PCMCIA slot and card, etc. Software and data transferred via communications interface 1124 are in the form of signals which can be electronic, electromagnetic, optical or other signals capable of being received by communications interface 1124. These signals 1126 are provided to communications interface via a channel 1128. This channel 1128 carries signals 1126 and can be implemented using wire or cable, fiber optics, a phone line, a cellular phone link, an RF link and other communications channels.

In this document, the terms "computer program medium" and "computer usable medium" are used to generally refer to media such as removable storage device 1118, a hard disk installed in hard disk drive 1112, and signals 626. These computer program products are means for providing software to computer system 1102.

Computer programs (also called computer control logic) are stored in main memory and/or secondary memory 1110. Computer programs can also be received via communications interface 1124. Such computer programs, when executed, enable the computer system 1102 to perform the features of the present invention as discussed herein. In particular, the computer programs, when executed, enable the processor 1104 to perform the features of the present invention. Accordingly, such computer programs represent controllers of the computer system 1102.

In an embodiment where the invention is implemented using software, the software may be stored in a computer program product and loaded into computer system 1102 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While the invention has been particularly shown and described with reference to preferred embodiments thereof, it will be understood by those skilled in the relevant art that various changes in form and details may be made therein without departing from the spirit and scope of the invention.

What is claimed is:

1. A distortion correction method comprising the steps of:
    (1) subdividing a field of view of at least one object in world space into at least one subdivided viewport, wherein each object in the world space is modeled by a polygon mesh;
    (2) defining a distortion mesh, each vertex in said distortion mesh having a texture coordinate that represents a pixel in an intermediate image;
    (3) projecting at least one polygon in the world space onto a selected subdivided viewport to produce said intermediate image, wherein said intermediate image provides a first approximation to the distortion;
    (4) rendering said intermediate image;
    (5) rendering said distortion mesh;
    (6) covering at least part of said rendered distortion mesh with at least part of said intermediate image to produce a final distorted image, wherein said covering of said rendered distortion mesh with said intermediate image is dependent upon an observer position; and
    (7) sending said final distorted image to a display generator.

2. The method of claim 1, further comprising the step of copying said intermediate image to a texture memory, and wherein step (6) comprises the step of covering at least part of said distortion mesh with at least part of said intermediate image stored in said texture memory.

3. The method of claim 2, wherein said step (6) comprises the step of covering at least part of said distortion mesh with at least part of said intermediate image stored in said texture memory using a bilinear interpolation technique.

4. The method of claim 1, wherein step (3) comprises the step of projecting one or more polygons in the world space onto a subdivided viewport using a 4×4 projection matrix which is operative on points in a homogeneous coordinate system (x,y,z,1).

5. The method of claim 1, wherein step (2) comprises the step of defining a distortion mesh only for those areas where distortion correction is needed.

6. The method of claim 1, wherein step (1) comprises the step of subdividing a field of view into at least two subdivided viewports.

7. The method of claim 1, wherein step (6) further comprises the step of interactively adjusting said distortion mesh based upon the observer's view of said final distorted image.

8. A distortion correction method comprising the steps of:
  (1) rendering one or more polygons in a world space that are projected onto a subdivided viewport to produce an intermediate image, wherein said immediate image provides a first approximation to the distortion;
  (2) rendering a distortion mesh, wherein each vertex in said distortion mesh has a texture coordinate that corresponds to a pixel in said intermediate image; and
  (3) covering at least part of said rendered distortion mesh with at least part of said intermediate image to produce a final distorted image, wherein said covering of said rendered distortion mesh with said intermediate image is dependent upon an observer position.

9. The method of claim 8, wherein step (1) is repeated for each subdivided viewport.

10. The method of claim 9, wherein step (1) is repeated for each subdivided viewport.

11. The method of claim 8, further comprising the step of copying said intermediate image to a texture memory, and
  wherein step (3) comprises the step of covering at least part of said distortion mesh with at least part of said intermediate image stored in said texture memory.

12. The method of claim 10, wherein said step (3) comprises the step of covering at least part of said distortion mesh with at least part of said intermediate image stored in said texture memory using a bilinear interpolation technique.

13. The method of claim 8, further comprises the step of projecting one or more polygons in the world space onto a subdivided viewport using a 4×4 projection matrix which is operative on points in a homogeneous coordinate system (x,y,z,1).

14. The method of claim 8, wherein step (2) comprises the step of rendering only portions of a distortion mesh where distortion correction is needed.

15. The method of claim 8 wherein step (3) further comprises the step of interactively adjusting said distortion mesh based upon the observer's view of said final distorted image.

16. A distortion correction system comprising:
  means for rendering (a) one or more polygons in a world space that are projected onto a subdivided viewport to produce an intermediate image, wherein said intermediate image provides a first approximation to the distortion, and (b) a distortion mesh, wherein each vertex in said distortion mesh has a texture coordinate that corresponds to a pixel in said intermediate image; and
  means for covering at least part of said rendered distortion mesh with at least part of said intermediate image to produce a final distorted image, wherein said covering of said rendered distortion mesh with said intermediate image is dependent upon an observer position.

17. The system of claim 16, further comprising means for subdividing a field of view into at least two subdivided viewports.

18. The system of claim 16, further comprising means for copying said intermediate image to a texture memory, and
  wherein said covering means covers at least part of said distortion mesh with at least part of said intermediate image stored in said texture memory.

19. The system of claim 18, wherein said covering means uses a bilinear interpolation technique.

20. The system of claim 14, further comprises means for projecting one or more polygons in the world space onto a subdivided viewport using a 4×4 projection matrix which is operative on points in a homogeneous coordinate system (x,y,z,1).

21. The system of claim 14, wherein said rendering means renders only those portions of a distortion mesh where distortion correction is needed.

22. The system of claim 16, wherein said distortion mesh is interactively adjusted based upon the observer's view of said final distorted image.

23. A computer program product, comprising:
  a computer usable medium having computer readable program code means embodied in said medium for implementing distortion correction, said computer readable program code means comprising,
  computer readable first program code means for causing a computer to effect a rendering of one or more polygons in a world space that are projected onto a subdivided viewport to produce an intermediate image, wherein said intermediate image provides a first approximation to the distortion;
  computer readable first program code means for causing a computer to effect a rendering of a distortion mesh, wherein each vertex in said distortion mesh has a texture coordinate that corresponds to a pixel in said intermediate image; and
  computer readable first program code means for causing a computer to effect a covering of at least part of said rendered distortion mesh with at least part of said intermediate image to produce a final distorted image, wherein said covering of said rendered distortion mesh with said intermediate image is dependent upon an observer position.

24. The computer program product of claim 23, wherein said computer readable first program code means for causing a computer to effect a covering of at least part of said rendered distortion mesh with at least part of said intermediate image to produce a final distorted image further comprises computer readable first program code means for causing a computer to interactively adjust said distortion mesh based upon the observer's view of said final distorted image.

25. A method for distortion correction in the display of computer generated imagery, comprising the steps of:
  (1) performing a first pass approximation, wherein said first pass approximation comprises the steps of:
    (a) subdividing a field of view of at least one object in world space into at least one subdivided viewport, wherein each object in the world space is modeled by a polygon mesh; and
    (b) projecting at least one polygon in the world space onto a selected subdivided viewport to produce an intermediate image, wherein said intermediate image provides a first approximation to the distortion; and (2) performing a second pass approximation, wherein said second pass approximation comprises the steps of applying portions of said intermediate image to portions of a distortion mesh using a texture projection technique to obtain an output image that is dependent upon an observer's position, wherein said distortion mesh includes vertices that have texture coordinates representing pixels in said intermediate image and wherein said distortion mesh is interactively adjusted based upon the observer's view of said output image;

wherein said first pass approximation provides enough resolution to said second pass approximation such that said second pass approximation outputs no more than two pixels for each computed pixel.

* * * * *